Oct. 9, 1934.    A. ROTTMANN    1,976,143
COOLING DEVICE FOR THE GLASS PLATES OF COPYING FRAMES
Filed Aug. 4, 1931
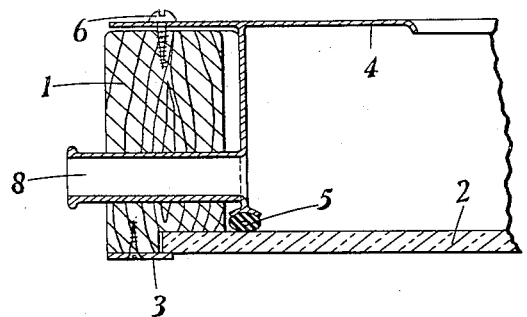
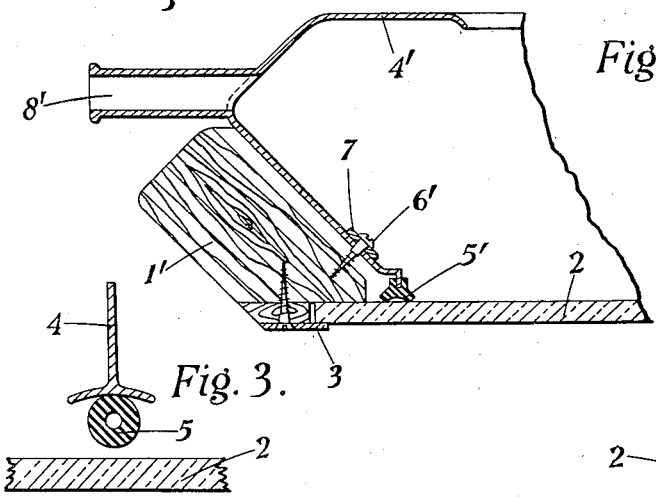
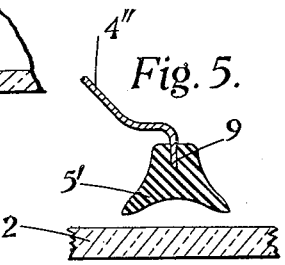
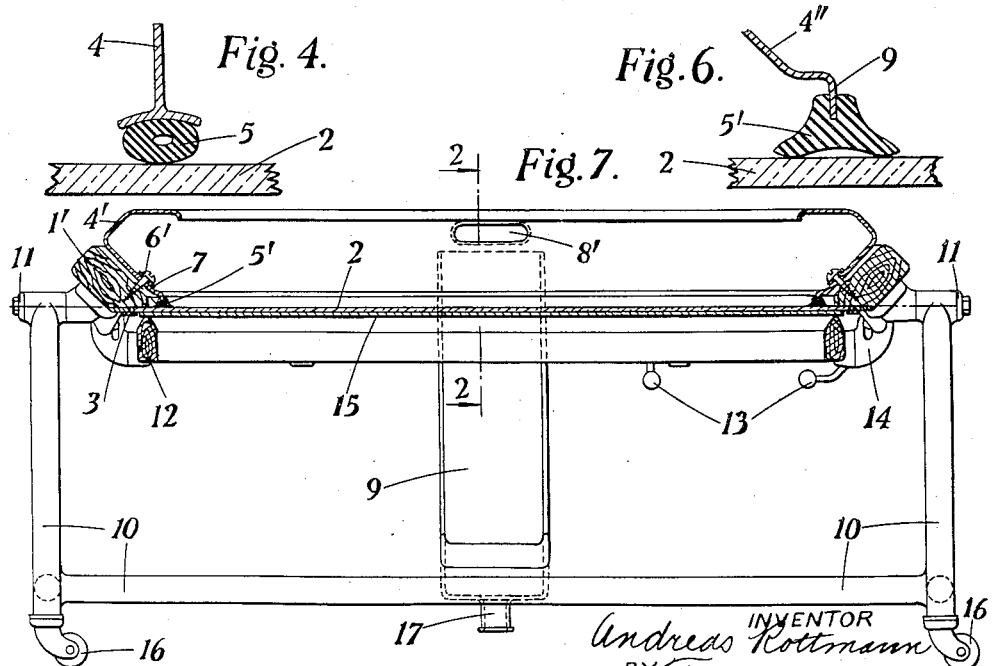
INVENTOR
Andreas Rottmann
BY
ATTORNEY Patented Oct. 9, 1934

UNITED STATES PATENT OFFICE 1,976,143

COOLING DEVICE FOR THE GLASS PLATES OF COPYING FRAMES

Andreas Rottmann, Dusseldorf, Germany, assignor to Paul Drews, Berlin, Germany, a corporation of Germany Application August 4, 1931, Serial No. 555,124
In Germany August 11, 1930

9 Claims. (Cl. 95—73)

I have filed an application in Germany, dated the 11th August 1930.

This invention relates to copying frames and has for its principal object the provision of means for cooling the glass plate of such frames.

A further object of the invention is to connect the glass plate to the copying frame in a water-tight manner.

As will be recognized, the glass plate has a different coefficient of expansion to the frame, and, by reason of the rigid connection of the glass plate to the frame, breakages of the plate are unavoidable in consequence of the unavoidable fluctuations in temperature during copying. The fitting of the glass plates into position, and particularly the replacement of broken glass plates, is extremely tedious and expensive.

According to the present invention the glass plate is not connected to the copying frame in a water-tight manner, but a separate framing of sheet metal or the like is provided for the layer of water, this framing being arranged at a suitable distance from the frame containing the glass plate, and being so packed relatively to the glass plate, but independently of the connection between the frame and the glass plate, that additional stresses in the glass plate are obviated even in the case of considerable differences in temperature. By reason of the invention, it is possible to touch up and secure the glass plate in its frame according to approved methods.

A further important advantage of the invention resides in the fact that by the subsequent application of a water cooling device to existing copying appliances the connection of the glass plate to the frame may remain unchanged. Also, the replacement of the glass plate in the event of breakage can be effected much more easily, as the glass plate can be released directly from the frame. When the glass plate is connected to the frame in a water-tight manner, however, the support of the glass plate is unavoidably damaged when removing the glass plate.

Considerable difficulties were also caused in packing when the water-tight connection was made with putty. By reason of the long time required for the drying of putty, this method was also very inconvenient and tedious. As soon as the putty sets completely cracks which are permeable to moisture are liable to occur.

The invention will now be described with reference to the accompanying drawing, wherein:—

Figure 1 shows a section of a construction of water trough when using a frame with substantially vertical sides.

Figure 2 shows a similar section, but in combination with a frame having inclined sides, the section being on the line 2—2 of Figure 7 to a larger scale.

Figure 3 shows by way of example a form of construction of a water-tight connection of the water trough to the glass plate before the joint is made.

Figure 4 shows the arrangement of Figure 3 after the joint has been made.

Figure 5 shows another arrangement of making a joint, and

Figure 6 shows the joint in the operative position.

Figure 7 shows an elevation partly in section of a copying frame in accordance with the invention.

On the frame 1 (Figure 1) there is placed loosely, in the manner usual in connection with copying frames, a glass plate 2. The glass plate 1 is secured in position in the frame in the usual manner by a holder 3. This method of applying the glass plate enables the plate to move laterally when heated.

A water trough 4 surrounds the interior of the frame, and, by tightening the screws 6, packing 5 is pressed tightly against the glass plate 2. The packing cord 5 preferably consists of yielding material such as rubber. An outflow pipe 8 from the trough passes through the frame 1.

The arrangement shown in Figure 2 is similar to that in Figure 1, except that the frame 1' has inclined walls. Consequently, the rim of the trough 4' relatively to the area of illumination of the frame projects less inwardly than that of the trough 4 is Figure 1, whilst the trough in Figure 2, where the frame has inclined walls, has a larger capacity for liquid for the same illuminating or copying area as the arrangement in Figure 1.

In the arrangement in Figure 2 the outflow 8' passes over the frame 1' without passing through this, whereas in Figure 1 the passage of the outflow through the frame influences the durability of the frame, particularly as regards warping. The arrangement of the outflow according to Figure 2 is also of advantage in application, particularly in the subsequent application of the device to existing copying appliances, as it is unnecessary to modify the frame.

Whereas in Figure 1 the screw 6 is outside the water trough, the screw 6' in Figure 2 is inside the surface to be rendered water-tight.

This arrangement of the securing screw 6' results from the inclined position of the walls of the frame. The head of the screw 6' is made water-tight by a packing washer 7. In this manner it is possible to make the trough, even in the case of a frame with inclined walls, water-tight relatively to the glass plate by the simplest means.

In Figures 3 and 4 is shown a construction of the packing. In Figure 3 the packing is shown in the inoperative position, and in Figure 4 in the operative position. The packing may, for example, consist of a tubular piece of rubber which forms a uniform joint between the trough and the glass plate.

In Figures 5 and 6 is shown a modified but particularly efficient form of construction of joint. The packing bar 5', preferably of rubber, is provided at the top with a groove 9, with which engages the rim of the trough 4''. According to the preferred arrangement, the rim of the trough is connected to the packing bar 5' by means of a waterproof varnish. The packing bar 5' bears, by means of two longitudinal beads, against the glass plate, and, consequently, has two packing zones, and is particularly suitably shaped for forming a uniform joint.

The thickness or depth of the packing member is preferably such that, even when the member adheres tightly to the surface of the glass plate, it is possible, by reason of lateral deflection of the packing member, for the glass plate to move laterally when heated or cooled without the glass plate being subjected to any deleterious stresses.

The fundamental idea of the invention is applicable to all types of troughs for use in the liquid cooling of copying appliances, and is not limited to the forms of construction illustrated in Figures 1 and 2.

It is possible to use other forms of packing between the trough and the glass plate. It is, however, essential that the type of construction of the trough and packing relatively to the glass plate fulfils the objects of the invention for protecting the glass plate from breakage, as is the case when it is rigidly connected to the frame, and to facilitate its application and replacement.

A form of construction of a copying frame to which the invention is applied is shown in Figure 7. In this form of construction the copying frame is provided with the arrangement shown in Figure 2.

Underneath the glass plate 2 there is provided a rubber covering 15 which is held in position around its edges by means of bars 12 held in position by brackets 14 and locking bolts 13. The entire frame is mounted by means of stub shafts 11 in a frame 10 fitted with rollers 16 so as to enable it to be conveniently transported. On the frame 10 is provided a trough 9 into which the water from above the glass plate 2 is discharged as the frame is tilted. The trough 9 is provided at its lower end with an outflow 17 so as to enable the water to pass out.

I claim:—

1. In combination with a copying frame and a glass plate mounted therein, means for applying liquid cooling means for said glass plate, comprising a framing located within said frame and spaced therefrom, and elastic packing means between said framing and said glass plate, the elasticity of said packing means being such as to allow expansion and contraction of said glass plate due to variations in temperature whilst maintaining a fluidtight joint.

2. In combination with a copying frame and a glass plate mounted therein, means for applying liquid cooling means for said glass plate, comprising a framing located within said frame and spaced therefrom, elastic packing means between said framing and said glass plate, the elasticity of said packing means being such as to allow expansion and contraction of said glass plate due to variations in temperature whilst maintaining a fluidtight joint, and means for pressing said packing tightly against said glass plate.

3. In combination with a copying frame and a glass plate mounted therein, means for applying liquid cooling means for said glass plate, comprising a framing located within said frame and spaced therefrom, and a tubular strip of rubber between said framing and said glass plate.

4. In combination with a copying frame and a glass plate mounted therein, means for applying liquid cooling means for said glass plate, comprising a framing located within said frame and spaced therefrom, and a strip of rubber between said framing and said glass plate.

5. In combination with a copying frame and a glass plate mounted therein, means for applying liquid cooling means for said glass plate, comprising a framing located within said frame and spaced therefrom, and a strip of rubber between said framing and said glass plate, said strip having a groove in its upper surface, said groove receiving the lower edge of said framing which is secured therein by a waterproof adhesive, and longitudinal spaced beads on the under surface of said strip.

6. In combination with a copying frame and a glass plate mounted therein, means for applying liquid cooling means for said glass plate, comprising a framing located within said frame and spaced therefrom, elastic packing means between said framing and said glass plate, the elasticity of said packing means being such as to allow expansion and contraction of said glass plate due to variations in temperature whilst maintaining a fluidtight joint, and screws passing through said framing and engaging with said frame, whereby said packing means are pressed tightly against said glass plate so as to form a liquidtight joint between said framing and said glass plate.

7. In combination with a copying frame and a glass plate mounted therein means for applying liquid cooling means for said glass plate, comprising a framing located within said frame and spaced therefrom, and elastic packing means between said framing and said glass plate, the elasticity of said packing means being such as to allow expansion and contraction of said glass plate due to variations in temperature whilst maintaining a fluidtight joint, and means for supplying liquid to said framing.

8. In combination with a copying frame and a glass plate mounted therein, means for applying liquid cooling means for said glass plate, comprising a framing located within said frame and spaced therefrom, and elastic packing means between said framing and said glass plate, the elasticity of said packing means being such as to allow expansion and contraction of said glass plate due to variations in temperature whilst maintaining a fluidtight joint, said frame having vertical walls, and an outflow pipe for liquid passing through one of said walls and to the interior of said framing.

9. In combination with a copying frame and a glass plate mounted therein, means for applying liquid cooling means for said glass plate, comprising a framing located within said frame and spaced therefrom, and elastic packing means between said framing and said glass plate, the elasticity of said packing means being such as to allow expansion and contraction of said glass plate due to variations in temperature whilst maintaining a fluidtight joint, said frame having outwardly inclined walls, and an outflow pipe for liquid extending over one of said walls and leading to the interior of said framing.

ANDREAS ROTTMANN.